United States Patent [19]
Ostendorf

[11] 4,018,906
[45] Apr. 19, 1977

[54] METHOD OF ALIGNING A PROTEIN SLURRY WITH A MAGNETIC FIELD TO PRODUCE A PROTEIN FOOD PRODUCT

[75] Inventor: James John Ostendorf, Affton, Mo.

[73] Assignee: Ralston Purina Company, St. Louis, Mo.

[22] Filed: Apr. 21, 1976

[21] Appl. No.: 678,798

[52] U.S. Cl. .............................. 426/237; 426/245; 426/246; 426/247; 426/656; 426/657; 426/515; 426/524

[51] Int. Cl.² .......................................... A23J 3/00

[58] Field of Search .......... 426/237, 241, 245, 246, 426/247, 656, 657, 515, 524, 802

[56] References Cited

UNITED STATES PATENTS

| | | | |
|---|---|---|---|
| 3,801,713 | 4/1974 | Tolstoguzov et al. | 426/802 X |
| 3,870,808 | 3/1975 | Boyer et al. | 426/524 X |
| 3,920,853 | 11/1975 | Middendorf et al. | 426/802 X |

OTHER PUBLICATIONS

B480,987, Mar. 1976, Kim et al., 426/802 X.

*Primary Examiner*—Raymond N. Jones
*Assistant Examiner*—Esther L. Massung
*Attorney, Agent, or Firm*—Virgil B. Hill

[57] ABSTRACT

The instant process describes a process for production of a protein food product by placing an aqueous proteinaceous slurry in a magnetic field and freezing the slurry to align the ice crystal layers generally in a manner which corresponds to the lines of force around the magnetic poles of the magnet. The ice crystal layers formed in this manner mold the protein layers in corresponding fashion and produce a protein structure upon heat setting which is highly simulative of a number of desirable food products. Alignment of the ice crystal layers of the magnetic field is remarkably uniform and consistently reproducible.

15 Claims, 1 Drawing Figure

U.S. Patent     April 19, 1977     4,018,906
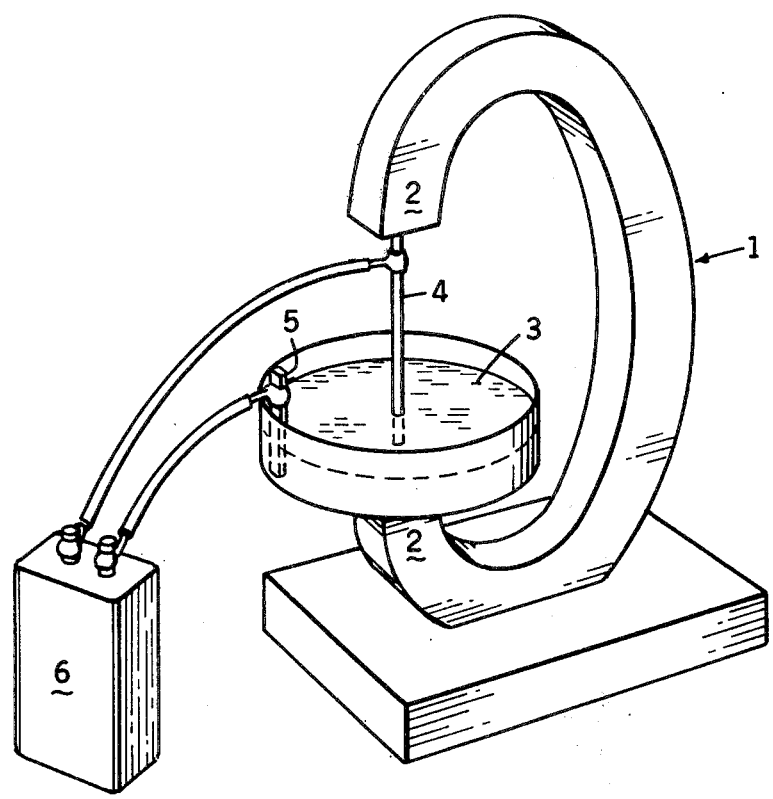

METHOD OF ALIGNING A PROTEIN SLURRY WITH A MAGNETIC FIELD TO PRODUCE A PROTEIN FOOD PRODUCT

BACKGROUND OF THE INVENTION

This invention relates to protein food products and more particularly to a method of forming structured protein food products from vegetable and/or animal protein substances.

A highly desirable goal in food processing has been to employ less desirable food materials which are highly nutritious, yet inexpensive, and processing these to result in highly appealing food products. Particular efforts have been directed toward the production of simulated meat products from vegetable and/or animal protein substances. Various degrees of success have been achieved by a variety of processes as is illustrated, for example, by U.S. Pat. No. 2,682,466 to Boyer involving spun filaments and U.S. Pat. Nos. 3,496,858 to Jenkins and U.S. Pat. No. 3,940,495 to Flier involving the extrusion of vegetable protein materials under conditions of elevated temperature and pressure into a zone of lower pressure to thereby expand the resultant material and produce an expanded, textured protein food product which is simulative of a real piece of meat when hydrated.

U.S. Pat. No. 3,920,853 discloses a process for the formation of structured protein food products wherein an aqueous slurry of protein material is frozen into ice crystal layers spaced apart by intermediate layers of slurried protein particles created by formation of the ice crystal layers. Freezing of the slurry causes all of the ice crystal layers to extend in a generally normalized direction to the area or part of the slurry which is contacted with a refrigerating medium. The ice layers cumulatively comprise an in situ matrix which spaces, molds and compresses the protein layers in striated fashion. Following freezing of the slurry the next process step is to remove the ice layers and fix the remaining protein layers into a striated arrangement which resembles actual muscle tissue. This is carried out by heating of the frozen slurry at a temperature sufficiently high to fix the protein layers and convert them to a substantially insoluble form while the slurry is in a frozen state. This results in removal of the ice crystal layers and provides protein layers arranged in striated fashion with lines of cleavage generally arranged in the same direction. This novel food product bears a close resemblance to meat as a result of this arrangement of striated protein layers.

U.S. Pat. No. 3,920,853 further discloses as a preferred embodiment, controlled freezing of the aqueous slurry to provide a controlled, directional heat exchange and achieve formation of the ice crystal layers in the slurry, which in turn molds the protein into layers. This directional heat exchange comprises placing the slurry in a predetermined configuration and contacting the slurry with a refrigerating surface or medium on at least one side while the remaining sides of the container are insulated to minimize heat exchange at these surfaces. This provides both ice crystal and protein layer formation in a direction generally normal to the uninsulated surface. This modification provides a satisfactory means of controlling the direction of ice crystal growth during the freezing process in order to achieve a particular degree of ice crystal formation and, hence, simulate a particular foodstuff.

The present invention represents an alternative to employing directional heat exchange in order to control formation of the ice crystal layers, and provides a means of controlling ice crystal formation in a consistent manner.

SUMMARY OF THE INVENTION

It was unexpectedly determined that placing the aqueous proteinaceous slurry in a magnetic field during the freezing process causes alignment of the ice crystal layers in a manner corresponding generally to a magnetic field or to the lines of force around the magnetic poles of the magnet. This arrangement of ice crystal layers consequently molds the protein layers in corresponding fashion and produces a protein structure upon heat setting which is highly simulative of a number of desirable food products. The magnetic field unexpectedly provides an alternative to the use of directional heat exchange as a means of controlling the direction of ice crystal formation. Depending upon the degree of orientation of the proteinaceous slurry in the magnetic field, the ice crystal layers will grow in a manner generally corresponding to the magnetic field or the lines of force normally associated with the magnetic poles of a magnet. Alignment of the ice crystal layers by the magnetic field is remarkably uniform and is consistently reproducible. The present invention, therefore, provides an alternative means of controlling alignment of the ice crystal layers in forming structured protein food products other than controlling the primary direction of heat transfer as is disclosed in U.S. Pat. No. 3,920,853.

BRIEF DESCRIPTION OF THE DRAWINGS

FIG. 1 generally illustrates the use of a magnetic field together with applied electrical potential to control ice crystal and protein layer formation pursuant to the present invention.

DESCRIPTION OF THE PREFERRED EMBODIMENTS

This invention may be practiced with either a vegetable or animal protein as a starting material or a combination thereof. The particular protein starting material should be capable of being "heat set" or irreversibly fixed, as set forth in the present invention, e.g. heating to a temperature above 150° F. while the ice layers serve as a mold for the protein to convert the protein to a firm, irreversible, substantially insoluble form. Whether a particular protein source is capable of being heat set within the scope of the present invention may be readily determined by one skilled in the art employing the process set out herein.

An animal protein material, for example, may be used as the starting material and may include generally various types of animal protein sources, i.e. red meat, fowl, fish and other sea foods. One of the most significant advantages of the present invention is that a particular protein source is not critical to its practice. Rather, any type of heat settable protein material, e.g. natural meat or secondary protein source material, including those which are considered to be of a less desirable quality and not as desirable for human consumption may be employed. This allows the use of economical meat by-products to produce the striated, protein food product of the present invention which in texture resembles closely, various highly desired foodstuffs to include preferred meat types. If an animal protein source is employed, it can be used in its native form without additional processing other than removal of bones or other inedible portions of the protein source.

In utilizing the protein source in the present process, it is first reduced to particulate form in a suitable grinder or food chopper. An exact degree of grinding is unnecessary, although generally it is that which is necessary to masticate or grind the protein source to a paste of uniform consistency, so that it may be easily slurried prior to processing. Various natural meat or animal protein sources such as chicken, or other types of fowl, chicken by-products, pork by-products, beef products, such as beef muscle, beef trimmings, beef liver, beef by-products, fish muscle, or fish trimmings may be selectively combined or used singularly depending on the desired flavor of the product produced.

One of the most revolutionary concepts of the present invention is that various secondary protein sources, including the more economical vegetable proteins may be employed as the sole protein source in the present invention to produce foodstuffs such as meat surrogate products, or alternately may be combined with animal protein materials having their natural flavor components to yield even more economical food products, which still resemble highly desired meat types in texture, but eliminate the need for a flavoring system, as is required when a bland protein source is employed.

Such secondary protein sources may be typically selected from a very broad class of proteinaceous materials capable of being heat set. These include vegetable protein, petro-protein, microbial protein and various secondary protein materials derived from natural meat processing operations, i.e. meat meal, poultry meal, fish meal, and/or various concentrates made therefrom. The vegetable proteins, particularly the oilseeds, such as soybeans, are among the most usable in the present invention since they are both economical and readily available as a protein source. As to the use of secondary protein sources, it is preferable to first place the source in a purified as well as hydrated form. This can most conveniently be accomplished by precipitation of the protein from a slurry of the secondary protein source. This yields the curd or damp viscous mass form of the protein which may be conveniently utilized as the protein source. Although the following will describe generally the processing of soybeans to yield the hydrated curd, it should be understood that with slight variations involving the isoelectric point of the proteins, the technique can generally be applied to any secondary protein source. It should also be recognized that the curd or hydrated form of protein can be dried and then also rehydrated without seriously affecting its usefulness as a protein source.

To obtain a protein concentrate or an isolate from a secondary protein source, it is necessary to separate or isolate the protein from non-proteinaceous materials. When producing a protein isolate from an oilseed such as soybeans, for example, a chemical precipitation and separation is usually employed. Typically, whole soybeans are crushed or ground in convenient fashion and passed through a conventional oil expeller. However, the oil is preferably removed by solvent extraction using various hydrocarbon type solvents normally employed for this purpose.

The resulting solids, commonly referred to as soybean meal, and normally in the form of flakes, contain many ingredients including complex proteins, sugars, fibers and others. The proteins and sugars are then preferably dissolved out of the solids. This may be done by adding the flakes to an aqueous bath and adding a food grade alkaline material to raise the pH substantially above 7. Typical of such alkaline materials is sodium hydroxide, potassium hydroxide, calcium hydroxide or other commonly accepted food grade alkaline reagents. The material is then extracted for a period of time sufficient to put the proteins and sugars in solution, usually about 30 minutes or so. The resulting liquor or solution is separated from the solids, as by passing the material through a screen and/or centrifuging. Preferably, the liquor is then cycled through a clarifier to remove tiny particles.

The soy proteins are then precipitated from the liquor by lowering the pH to an acidic value of the isoelectric point of the protein, usually pH of 4.6 to 4.9, with the addition of a common food grade acidic reagent such as acetic acid, phosphoric acid, citric acid, tartaric acid or others. The precipitate is then separated as by centrifuging and washed with water to remove remaining sugars, except for a minute trace of sugars which is almost impossible to remove. The precipitated curd is a viscous aqueous slurry having a solids content of 10 to 40% by weight, preferably about 20% by weight containing between about 90 and 98% by weight protein on a dry solids basis and between about 60 and 90% by weight water.

The selected protein starting material is initially made into an aqueous slurry by slurrying of the protein material which may be carried out by homogenization or blending. The aqueous slurry of protein material will be formulated to allow for the addition of a sufficient amount of the protein material, or the addition of water or other ingredients to adjust the solids content in the slurry to a level above at least about 5% by weight, but preferably between about 15 and 30% by weight of the slurry. The addition of protein starting material to achieve the prescribed solids level will also be such that the slurry will have a protein content of at least about 5% by weight, but preferably between about 15 and 30% by weight.

Prior to formation of the slurry, various other ingredients will be formulated for addition to the mixture to contribute to the flavor and taste of the food product produced thereby. For example, various smoke or charcoal flavorings, herbs or spices as contribute to the flavor of the product may be added to the mixture at this stage.

There may also be added to the slurry at this stage other ingredients which have been found to additionally contribute to the textural characteristics of the striated food product of the present invention, besides just contributing to and improving the flavor and taste of the food product. Salt, for example, is such an ingredient and is a necessary ingredient for the seasoning and flavoring of a natural meat material. Accordingly, the addition of various salts such as sodium chloride, calcium chloride, or trisodium phosphate improves the flavor and taste characteristics of the product although if above about 3% by weight is added to the mixture in the present process a very salty taste is attained. It has also been determined, however, that if above about 3% by weight is added to the slurry, not only is the taste of the product too salty, but furthermore, in some instances when the protein starting material is contacted with a refrigerating medium to form segregated ice crystal layers with intermediate layers of protein particles, followed by irreversible fixing of these protein layers, a gel-like or rubbery texture is obtained. This result is in contrast to the product having layers of protein material with local zonal lines of cleavage generally arranged in the same direction, which is obtained when lesser amounts of salt are employed.

In general, it is preferable that the pH of the proteinaceous slurry be within the range of 4 to 6 to obtain optimum results. However, the process will produce an acceptable product over a very wide and noncritical pH range.

The aqueous slurry of the protein material as formulated will then be slurried prior to engagement of the slurry with a refrigerating medium. Such slurrying will generally comprise grinding, blending, comminuting or homogenizing of the aqueous slurry of the protein material to in general reduce the protein starting material into small particles. This also promotes uniform mixing with other ingredients added to the slurry at this stage. Although the exact degree of grinding, comminuting or homogenizing, treatment is not critical to the practice of the present invention or the production of the novel striated food product thereby, the treatment step of grinding or homogenizing may be carried out in various equipment such as a Versator, colloid mill or high speed blending equipment as will produce a uniform and consistent slurry of the protein starting material. In general, the slurry will be uniform and the protein reduced to a small enough particle size that it will resemble a uniform emulsion, for example, if a high percentage of water insoluble material such as fats and oils are employed. Providing for the production of a consistent and uniform slurry promotes the formation of a highly uniform and consistent food product by the present process.

After treatment of the aqueous slurry by homogenization, or other suitable treatment means, the slurry is preferably deaerated by using a vacuum or a piece of equipment such as a Versator which is equipped to perform such a function during homogenization. While deaeration is not critical to the practice of the novel process; nevertheless, it is preferable in promoting consistency and uniformity of the striated food product of the present invention. The presence of air in the slurry after contact with the refrigerating medium and heat setting thereof will create voids which will detract from the striated layers of protein with lines of cleavage in local zones so as to interrupt these lines of cleavage. Deaeration therefore results in production of striated protein layers with uninterrupted and continuous lines of cleavage, and is preferable in the practice of the present invention.

The slurry of the proteinaceous starting material is controllably frozen during the freezing process by placing the proteinaceous slurry in a magnetic field so as to generally align the ice crystal layers in a manner corresponding to the field of lines of force around the poles of a magnet. This provides directional ice crystal formation which corresponds to the field of the magnet or to the lines of force in the space around the magnetic poles of a magnet. Freezing creates a structuring effect on the protein by forming spaced, thin ice crystal layers in the suspension or slurry of the protein starting material which in turn act as molds to compress the protein particles into adjacent and generally coherent layers. These protein layers also correspond generally to the magnetic field or lines of force created by the poles of the magnet, at least in local zones. The primary advantage of placing the proteinaceous slurry in the magnetic field during the freezing process is to achieve consistent alignment of the ice crystal layers, other than achieving this by controlling the primary direction of heat transfer. Freezing of the proteinaceous slurry, while under the influence of the magnetic field distributed the ice crystal layers in a manner generally corresponding to the lines of force in a magnetic field. This created uniform and consistent distribution of ice crystal layers which is simulative of a number of highly desirable meat-type products.

The magnetic field is believed to orient the ice crystal layers because the proteinaceous slurry is in effect an electrolytic medium because of the presence of various types of ions normally in the proteinaceous slurries as an inherent ingredient of the proteinaceous material or as an ingredient for food products in general. These ions under the influence of the magnetic field, tend to migrate in a manner corresponding to the lines of force associated with a magnetic field. Simultaneous freezing of the slurry fixes the ice layers in the same manner.

The particular strength of the magnetic field in which the proteinaceous slurry is placed to achieve alignment of the ice crystal layers is not critical to the practice of the present invention. The field strength may vary considerably, depending on whether or not an electrical potential is also applied to the slurry during exposure to the magnetic field in order to control alignment of the ice crystal layers in the manner described herein. The use of an applied electrical potential consists of applying a voltage to the proteinaceous slurry in order to get the ions to migrate to some extent in the electrolytic medium but under the influence of the magnetic field causes them and, hence, the ice crystals to align in a manner which generally corresponds to the lines of force of the magnetic field. This permits the use of a much weaker magnetic field since the applied potential tends to enhance the effect of the magnetic field in this respect. The formulation of the proteinaceous slurry for alignment of the ice crystal layers to correspond to the magnetic field is not at all critical since generally a proteinaceous slurry provides a sufficient electrolyte to influence the growth of ice crystal layers. It is, therefore, not essential to the practice of the present invention to include special ingredients in the proteinaceous slurry to achieve an alignment of the ice crystal layers described pursuant to the process disclosed herein.

As noted above, the strength of the magnetic field is not critical to the practice of the present invention and magnets having a field strength of between about 1,000 to 10,000 gauss have been typically employed in the process of the present invention although with a lower strength magnet such as that of around 1,000 gauss an electrical potential of between about 3 and 12 volts is typically necessary to initiate migration of the ions. Ions in the aqueous proteinaceous slurry would naturally tend to migrate to the electrodes from which the electrical potential is applied; however, the influence of the magnetic field creates migration in a manner corresponding to the lines of force of the magnetic field. Simultaneous freezing of the slurry forms the ice crystal layers in a manner corresponding to the lines of force in the magnetic field thereby providing a means of consistently reproducing ice crystal growth in a proteinaceous slurry absent the use of directional heat transfer.

It is necessary that the container for the proteinaceous slurry in the present invention be a nonferrous metal or plastic material of some type to minimize influence of it on the magnetic field and, hence, disrupt ice crystal formation in the desired manner. It is, of course, a well known phenomena that ferrous metals will react to a magnetic field and, hence, the use of a container of this type would disrupt the formation of ice crystal layers in the manner desired.

As a preferred embodiment, a particular freezing rate has also been found to result in good formation of ice crystal layers which in turn are capable of crystalline molding and compressing the protein into generally coherent layers. It has been found, however, that any freezing rate may be in general employed to structure the protein. This includes very rapid freezing or almost instantaneous freezing as, for example, would be obtained by dipping or submerging the material in liquid nitrogen. However, for the production of food products which resemble a more coarse type of muscle tissue, a somewhat slower freezing rate is preferred since this tends to enhance formation of larger crystal layers and, hence, produce larger striations. A rapid freezing rate would result in the growth of smaller and finer ice crystal layers as opposed to large ice crystal layer growth, which crystalline molds the protein into a structure with larger striations. Of course, if a different structure, which is much finer, and with smaller, more uniform striations is desired, then a very rapid freezing rate may be employed. A selection may be made between a very rapid or slower freezing rate which is dependent on the texture of the foodstuff being produced. Furthermore, rapid freezing has the obvious commercial advantage of increasing productive capacity as opposed to a slower freezing technique.

A specific freezing rate which is suitable to produce a crystalline molding effect on the protein particles and hence upon cooking, the striated food product of the present invention is for the slurry temperature to be reduced and pass through the freezing point range of the slurry in at least about 5 minutes. The freezing point range of the slurry will normally be the temperature range of between about 32°–27° F. as measured at any point in that slurry. This freezing rate results in good formation of the ice crystal layers, which mold the protein particles into striated, generally coherent layers.

It should be recognized that the temperature range referred to is that of the slurry temperature as opposed to the refrigerating medium temperature since the refrigerating medium may be of any temperature as long as the temperature of the protein slurry is reduced at the desired freezing rate. The use of this particular freezing rate, while it is not intended to be limiting as the only freezing rate suitable for production of the novel food product of the present invention, results in good ice crystal layer formation.

After controlled freezing of the proteinaceous slurry to form segregated ice crystal layers, spaced by intermediate crystalline molded layers of protein, in a generally normalized direction, the ice layers at this point cumulatively comprise a matrix or mold which spaces and compresses the protein layers. Therefore, the protein layers must be irreversibly fixed after crystalline molding thereof to result in a striated arrangement of the protein layers. This irreversible fixation may be carried out by raising the temperature of the frozen proteinaceous slurry to a temperature above about 150° F. but preferably above about 180° F. When the proteinaceous slurry is raised to above this temperature, the ice crystal layers are melted during the temperature rise of the slurry and as the slurry temperature is raised above about 150° F., preferably above about 180° F., irreversible fixation of the protein layers occurs.

Heating of the product to carry out irreversible fixation of the protein layers may be carried out in nearly any heating device and at nearly any temperature so long as the temperature in the proteinaceous body achieves the prescribed level. The temperature of the surrounding environment or heating chamber employed, however, should not be so high as to scorch or burn the proteinaceous mass. A convenient means and a specific embodiment of carrying out the heating step, therefore, is to use a steam chamber fed by live steam and to maintain the chamber temperature at at least about 212° F.

The heating step of irreversible fixation of the protein layers must be carried out at a rapid enough rate to achieve a temperature of at least about 150° F. in the mass within a period of time of between about 5 minutes and several hours with the exact rate being dependent on the size of the material. Heating at this rate insures fixation of the temporarily self-supporting protein layers without disruption thereof. During this heating step as heat setting of the protein layers occurs, no appreciable degree of support is needed for the protein layers to prevent disruption thereof if heating is carried out at the aforementioned rate. In other words, the frozen proteinaceous mass may be removed from the mold or container and heated by itself or it may also be preferably kept in its mold or container which provides some degree of support during irreversible fixation of the protein layers. In the latter case, the rate of heating is not as important as long as heat setting of the protein layers occurs.

Thus, the degree of support for the protein layers during the heating step is generally not critical to the formation of the striated food product of the present invention. It is, however, preferred to provide some degree of support for the proteinaceous mass during the heating step as opposed to removal from the mold or container in which it is frozen to prevent sagging or disruption of the layers. This is true especially if a large mass is involved or if the temperature of the mass is slowly raised rather than rapidly raised. This preferred degree of support may range from simply wrapping the frozen proteinaceous body in foil to retaining it in its mold or container employed during the freezing process while heating of the mass to the prescribed temperature is carried out.

The following Examples will generally serve to be illustrative rather than to limit my invention, since it should be understood that numerous other Examples could be given to illustrate the novel characteristics of the present process.

EXAMPLE 1

Clean, dehulled soybeans were ground and the oil extracted with hexane to give defatted flakes. The flakes were then added to an aqueous bath and a food grade alkaline reagent calcium hydroxide was added until a pH of about 10 was achieved. The flakes were then extracted for a period of 30 minutes and centrifuged in order to clarify the proteinaceous extract resulting therefrom. The protein material was precipitated from the clarified liquor by adding phosphoric acid until the isoelectric point of the protein was reached at a pH of about 4.7. The precipitate was then washed with water and centrifuged in order to concentrate the material. The resulting protein isolate "curd" had a solids content of about 20% by weight and a protein purity of about 90% by weight on a dry solids basis. An aqueous proteinaceous slurry was formed by employing the protein isolate or "curd" having a solids content of about 20% and a pH of about 4.7. This slurry was homogenized and then deaerated by placing the slurry in a desiccator which was subjected to a vacuum for a short period of time in order to remove entrapped air. The proteinaceous slurry was then placed in a cylindrical plastic dish having a diameter of 4 9/16 inches I.D. with a height of 1⅜ inches and the dish was open on the top. The dish containing the slurry was placed between the poles of a magnet as is specifically illustrated by FIG. 1. The magnet 1 generally had the shape of the letter "C" and the poles of the magnet 2 had enough of an opening between them in order to place the container with the slurry 3. The slurry 3 was then equipped for the application of an electrical potential by suspension of an electrode 4 in the center of the slurry and the use of a copper strip 5 as another electrode along the edge of the plastic container. These electrodes were connected to a variable voltage supply source battery 6 and the entire assembly placed in a freezer at a temperature of −20° C. The magnet had a field strength of 1500 gauss and an electrical potential of about 6 volts was applied to the slurry during the freezing process. Following freezing of the slurry, the dish containing the slurry was removed and while in a frozen state, placed in a steam chest maintained at a temperature of about 212° F. and the slurry cooked for 30 minutes. After cooking, an examination of the product revealed a proteinaceous meat-like product having striations throughout the product which were a result of a highly ordered growth of ice crystal layers. A cross sectional examination of the product clearly indicated that ice crystal growth had occurred generally along the lines of force between the poles of the magnet. This was observed to result in a meat-like product with consistent and uniform striations throughout.

EXAMPLE 2

An aqueous proteinaceous slurry was prepared using the soy protein isolate produced generally as described in Example 1 having a solids content of 24% by weight and was at a pH of 4.57. To the curd or soy protein isolate 0.97% sodium chloride and 2.42% fat was added. The slurry was then homogenized and then deaerated by placing it in a desiccator which was subjected to a vacuum for a short period of time in order to remove entrapped air. The slurry was then placed in a plastic pouch which was placed between the poles of an electromagnet having a magnetic field strength of 10,000 gauss. The pouch was small enough to fit between the 1¼ inch gap between the poles of this magnet. Surrounding the plastic pouch containers with the proteinaceous slurry, a dry ice and an alcohol bath in an aluminum container were used in order to freeze the slurry. This provided a temperature of approximately −48° F. and the slurry during exposure to the magnetic field required approximately 8 minutes for complete freezing. Following freezing of the slurry, the container with the proteinaceous slurry was removed and while in a frozen state placed in a steam chest wherein the sample was heated at 250° F. at 15 psi for 30 minutes in order to cook the product. After cooking, an examination of the product revealed a proteinaceous meat-like product having striations throughout the product which corresponded generally to the lines of force created by the poles of the magnet. A cross sectional examination of the product clearly indicated that the ice crystal growth had occurred generally along these lines of force. This was determined to result in a meat-like product with consistent and highly ordered striations throughout the product corresponding to highly ordered growth of ice crystal layers during the freezing process.

While the above described Examples set forth specific embodiments of the present invention, it is considered that the invention is not specifically limited to details of the disclosure but is to be defined by the scope of the appended claims which includes all reasonable equivalents of the present invention.

I claim:

1. A method of preparing a structured protein food product comprising the steps of
   a. freezing an aqueous slurry of a protein material having a solids content of at least about 5% by weight while said slurry is subjected to a magnetic field to form ice crystal layers which would mold the protein material of the slurry into layers corresponding generally to the lines of force of the magnetic field, and
   b. heat setting the protein layers into a substantially insoluble form by heating the frozen slurry to a temperature sufficiently high to allow the protein layers to set and lower than a temperature at which the protein will degrade, thereby melting the ice crystal layers to form a structured protein food product.

2. The method of claim 1 wherein said protein material is an animal protein material.

3. The method of claim 1 wherein said protein material is a vegetable protein material.

4. The method of claim 3 wherein said vegetable protein material is a soybean material.

5. The method of claim 1 wherein said protein material is a mixture of an animal protein material and a vegetable protein material.

6. The method of claim 1 wherein said slurry is heat set at a temperature of at least about 150° F.

7. A method of preparing a structured protein food product comprising the steps of
   a. freezing an aqueous slurry of a protein material having a solids content of at least about 5% by weight while said slurry is subjected to a magnetic field with an applied electrical potential to form ice crystal layers which mold the protein material of the slurry into layers generally corresponding to the lines of force of the magnetic field, and
   b. heat setting the protein layers into substantially insoluble form by heating the frozen slurry to a temperature sufficiently high to allow the protein layers to set and lower than a temperature at which the protein will degrade, thereby melting the ice crystal layers to form the structured protein food product.

8. The method as set forth in claim 7 wherein said magnetic field has a field strength of at least about 1,000 gauss.

9. The method as set forth in claim 7 wherein said applied electrical potential is between about 3 and 12 volts.

10. A method of preparing a structured protein food product comprising the steps of
    a. freezing an aqueous slurry of a protein material having a solids content of at least about 5% by weight to reduce the slurry temperature through the freezing point range of said slurry in not less than about 5 minutes while said slurry is subjected to a magnetic field to form ice crystal layers which mold the protein material of the slurry into layers, generally corresponding to the lines of force of the magnetic field, and
    b. heat setting the protein layers into a substantially insoluble form, by heating the frozen slurry to a temperature sufficiently high to allow the protein layers to set and lower than a temperature at which the protein will degrade, thereby melting the ice crystal layers to form a structured protein food product.

11. The method of claim 10 wherein said slurry has a solids content of at least about 15% by weight.

12. The method of claim 10 wherein said freezing point range of said slurry comprises between about 32°–27° F.

13. The method of claim 10 wherein said protein material is a vegetable protein material.

14. The method of claim 10 wherein said vegetable protein material is a soybean material.

15. The method of preparing a structured protein food product comprising the steps of
    a. freezing an aqueous slurry of a protein material having a solids content of at least about 5% by weight to reduce the slurry temperature through a freezing point range of between about 32°–27° F. in not less than about 5 minutes while said slurry is subjected to a magnetic field to form ice crystal layers in said slurry which generally correspond to the lines of force of the magnetic field thereby molding the protein material of the slurry into layers also corresponding to the lines of force of the magnetic field, and
    b. heat setting the protein layers into a substantially insoluble form by heating the frozen slurry to a temperature of at least about 150° F. thereby melting the ice crystal layers to form the structured protein food product.

* * * * *